US012486473B2

(12) United States Patent
Wang et al.

(10) Patent No.: US 12,486,473 B2
(45) Date of Patent: Dec. 2, 2025

(54) POST CMP CLEANING COMPOSITION

(71) Applicant: ENTEGRIS, INC., Billerica, MA (US)

(72) Inventors: Volley Wang, Zhubei (TW); Atanu K. Das, Southbury, CT (US); Michael L. White, Ridgefield, CT (US); Chun-I Lee, Zhubei (TW); Nilesh Gunda, North Chelmsford, MA (US); Daniela White, Ridgefield, CT (US); Donald Frye, Sherman, CT (US)

(73) Assignee: ENTEGRIS, INC., Billerica, MA (US)

( * ) Notice: Subject to any disclaimer, the term of this patent is extended or adjusted under 35 U.S.C. 154(b) by 380 days.

(21) Appl. No.: 18/124,355

(22) Filed: Mar. 21, 2023

(65) Prior Publication Data

US 2023/0323248 A1 Oct. 12, 2023

Related U.S. Application Data

(60) Provisional application No. 63/357,524, filed on Jun. 30, 2022, provisional application No. 63/323,054, filed on Mar. 23, 2022.

(51) Int. Cl.

| | |
|---|---|
| ***C11D 1/66*** | (2006.01) |
| ***C11D 3/00*** | (2006.01) |
| ***C11D 3/04*** | (2006.01) |
| ***C11D 3/20*** | (2006.01) |
| ***C11D 3/22*** | (2006.01) |
| ***C11D 3/24*** | (2006.01) |
| ***C11D 3/30*** | (2006.01) |
| ***C11D 3/33*** | (2006.01) |
| ***C11D 3/36*** | (2006.01) |
| ***C11D 3/43*** | (2006.01) |
| ***C11D 17/00*** | (2006.01) |
| *C11D 1/00* | (2006.01) |

(52) U.S. Cl.

CPC .............. *C11D 3/0042* (2013.01); *C11D 1/66* (2013.01); *C11D 3/042* (2013.01); *C11D 3/2075* (2013.01); *C11D 3/2079* (2013.01); *C11D 3/2082* (2013.01); *C11D 3/22* (2013.01); *C11D 3/245* (2013.01); *C11D 3/30* (2013.01); *C11D 3/361* (2013.01); *C11D 3/43* (2013.01); *C11D 17/0008* (2013.01); *C11D 1/00* (2013.01); *C11D 2111/22* (2024.01)

(58) Field of Classification Search

CPC ........... C11D 1/00; C11D 3/042; C11D 2/006; C11D 3/2075; C11D 3/2079; C11D 3/2082; C11D 3/22; C11D 3/30; C11D 3/323; C11D 3/361; C11D 1/66; B08B 3/08; B08B 3/10

USPC ....... 510/175, 176, 475, 477, 488, 499, 500, 510/505, 506; 134/1.2, 1.3

See application file for complete search history.

(56) References Cited

U.S. PATENT DOCUMENTS

| | | | | |
|---|---|---|---|---|
| 9,074,170 B2 * | 7/2015 | Barnes | C11D 3/245 |
| 2007/0161528 A1 * | 7/2007 | Wu | C11D 7/34 510/175 |
| 2020/0024554 A1 | 1/2020 | White et al. | |
| 2020/0071642 A1 | 3/2020 | Thomas et al. | |
| 2020/0115661 A1 | 4/2020 | Grandstrom et al. | |
| 2020/0199500 A1 * | 6/2020 | White | C09K 13/00 |
| 2020/0255770 A1 * | 8/2020 | Das | C11D 3/221 |
| 2022/0106541 A1 | 4/2022 | Thomas et al. | |
| 2022/0106542 A1 | 4/2022 | White et al. | |
| 2022/0336210 A1 | 10/2022 | Liu | |

FOREIGN PATENT DOCUMENTS

| | | |
|---|---|---|
| TW | 200728455 A | 8/2007 |
| TW | 200907050 A | 2/2009 |
| TW | 202016277 A | 5/2020 |
| TW | 202026411 A | 7/2020 |
| WO | 2006127885 A1 | 11/2006 |
| WO | 2008144501 A2 | 11/2008 |

* cited by examiner

*Primary Examiner* — Gregory R Delcotto

(57) ABSTRACT

The invention provides compositions useful in post-CMP cleaning operations where ceria is present. In one aspect, the invention provides a composition comprising a reducing agent; a chelating agent; an amino($C_6$-$C_{12}$ alkyl)alcohol; and water; wherein the composition has a pH of less than about 8. The compositions of the invention were found to show improved ceria removal on, for example, poly silicon (poly Si) substrates. Also provided is a method for cleaning a microelectronic device substrate using such compositions and a kit comprising, in one or more containers, selected components of the compositions.

9 Claims, No Drawings

POST CMP CLEANING COMPOSITION

TECHNICAL FIELD

The invention relates generally to compositions and methods for removing post CMP residues from the surface of a microelectronic device.

BACKGROUND

Microelectronic device wafers are used to form integrated circuits. The microelectronic device wafer includes a substrate, such as silicon, into which regions are patterned for deposition of different materials having insulative, conductive or semi-conductive properties.

In order to obtain the correct patterning, excess material used in forming the layers on the substrate must be removed. Further, to fabricate functional and reliable circuitry, it is important to prepare a flat or planar microelectronic wafer surface prior to subsequent processing. Thus, it is necessary to remove and/or polish certain surfaces of a microelectronic device wafer.

Chemical Mechanical Polishing or Planarization ("CMP") is a process in which material is removed from a surface of a microelectronic device wafer, and the surface is polished (e.g., planarized) by coupling a physical process such as abrasion with a chemical process such as oxidation or chelation. In its most rudimentary form, CMP involves applying an abrasive slurry having an active chemistry to a polishing pad that buffs the surface of a microelectronic device wafer during the removal, planarization, and polishing processes. Removal or polishing processes using purely physical or purely chemical action are not as effective as the synergistic combination of both in order to achieve fast, uniform removal. In addition, in the fabrication of integrated circuits, the CMP slurry should also be able to preferentially remove films that comprise complex layers of metals and other materials so that highly planar surfaces can be produced for subsequent photolithography, or patterning, etching and thin-film processing.

A CMP slurry using ceria particles generally achieves a faster polishing speed for an insulator, relative to a silica-containing slurry. Moreover, a ceria-based slurry is most often used because of the ability to achieve Shallow-Trench Isolation (STI) pattern planarization with minimal oxide erosion. Disadvantageously, ceria-based slurries are difficult to remove from STI structures because of the oppositely charged zeta potentials of the ceria particles relative to the silicon oxide and silicon nitride surfaces. If a device is manufactured with these residues remaining on the wafer, the residues will lead to short circuits and an increase in electrical resistance. Ceria particles are also a problem with FinFET structures following CMP processing using ceria slurries.

Thus, a need exists for improved post CMP cleaning compositions which effectively remove both residual particles as well as those residues adhering to the dielectric wafer surface.

SUMMARY

In summary, the invention provides compositions useful in post-CMP cleaning operations where ceria is present. In a first aspect, the invention provides a composition comprising a. a reducing agent;
b. a chelating agent;
c. an amino($C_6$-$C_{12}$ alkyl)alcohol; and
d. water;

wherein the composition has a pH of less than about 8.

The compositions of the invention were found to show improved ceria removal on, for example, poly silicon (poly Si) substrates.

Also provided is a method for cleaning a microelectronic device substrate using such compositions and a kit comprising, in one or more containers, one or more components of the compositions.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

In a first aspect, the invention provides a composition comprising a. a reducing agent;
b. a chelating agent;
c. an amino($C_6$-$C_{12}$ alkyl)alcohol; and
d. water;

wherein the composition has a pH of less than about 8.

In one embodiment, the composition will be comprised of about 60 to 90 weight percent water, about 0.01 to about 10 weight percent of a chelating agent, and about 0.1 to about 5 weight percent, or about 0.1 to about 2 weight percent of an amino($C_6$-$C_{12}$ alkyl)alcohol.

In certain embodiments, the composition consists of or consists essentially of components a. through d. above, optionally combined with one or more other ingredients as described herein. As used herein, unless otherwise specified, a composition or ingredient of a composition that is described as "consisting essentially of" one or more specified items refers to a composition or ingredient that is made up of only those specified items with not more than an insubstantial amount of other (additional) materials, e.g., contains only the specified items and not more than 5, 3, 2, 1, 0.5, 0.1, 0.05, or 0.01 weight percent additional ingredients based on the total weight of the composition or the ingredient. As used herein, a composition or ingredient of a composition that is described as "consisting of" one or more specified items refers to a composition or ingredient that is made up of only those specified items.

As noted above, the pH of the composition is less than about 8. In certain embodiments, the pH will be neutral or acidic, for example from about 1 to about 7 and in other embodiments, the pH will be from about 1.5 to about 6.5. One of ordinary skill in the art will recognize those acids and bases (i.e., pH adjustors) suitable for this purpose.

In one embodiment, the pH adjustor is a base. Exemplary pH adjustors for this purpose include bases such as choline hydroxide, tetrabutylphosphonium hydroxide (TBPH), tetramethylphosphonium hydroxide, tetraethylphosphonium hydroxide, tetrapropylphosphonium hydroxide, benzyltriphenylphosphonium hydroxide, methyl triphenylphosphonium hydroxide, ethyl triphenylphosphonium hydroxide, N-propyl triphenylphosphonium hydroxide, tetraethylammonium hydroxide (TEAH), tetrapropylammonium hydroxide (TPAH), tetrabutylammonium hydroxide (TBAH), trimethylethylammonium hydroxide, diethyldimethylammonium hydroxide, tributylmethylammonium hydroxide (TBMAH), benzyltrimethylammonium hydroxide (BTMAH), tetramethylammonium hydrochloride (TMAH), tris(2-hydroxyethyl)methyl ammonium hydroxide, diethyldimethylammonium hydroxide, arginine, potassium hydroxide, cesium hydroxide and combinations thereof.

In one embodiment, the pH adjustor is chosen from choline hydroxide and tetraethylammonium hydroxide (TEAH).

In another embodiment, the pH adjustor is an acid and, for example, can be chosen from nitric acid, citric acid, sulfuric acid, phosphoric acid, hydrochloric acid, hydrobromic acid, methanesulfonic acid, benzenesulfonic acid, and p-toluenesulfonic acid, trifluoromethanesulfonic acid, acetic acid, lactic acid, glycolic acid or any combination thereof. In one embodiment, the pH adjustor is nitric acid.

In certain embodiments, the composition further comprises one or more buffers. In one embodiment, the composition further comprises N-(2-hydroxyethyl)piperazine-N'-(2-ethanesulfonic acid).

Exemplary reducing agents include compounds such as hypophosphorous acid ($H_3PO_2$), ascorbic acid, L(+)-ascorbic acid, isoascorbic acid, ascorbic acid derivatives, DEHA (diethylhydroxylamine), reducing sugar (galactose) and combinations thereof. Additionally, phosphorous acid, sulfurous acid, ammonium and potassium thiosulfate, xylose, sorbitol. N-aminomorpholine, N-aminopiperazine, hydroquinone, catechol, tetrahydrofulvalene, N,N-Dimethylanilinebenzylamine, hydroxylamine and other sulfur based reducing agents may be utilized. In one embodiment, the reducing agent is chosen from hypophosphorous acid and L-ascorbic acid.

As used herein, the term "chelating agent" includes those compounds that are understood by one skilled in the art to be complexing agents, chelating agents and/or sequestering agents. Chelating agents will chemically combine with, coordinate, or physically hold the metal atom and/or metal ion to be removed using the compositions described herein. Exemplary chelating agents include phosphonates (e.g., 1-hydroxyethylidene-1,1-diphosphonic acid (HEDP), 1,5,9-triazacyclododecane-N,N',N"-tris(methylenephosphonic acid) (DOTRP), 1,4,7,10-tetraazacyclododecane-N,N',N",N'"-tetrakis(methylenephosphonic acid) (DOTP), nitrilotris(methylene)triphosphonic acid, diethylenetriaminepentakis(methylenephosphonic acid) (DETAP), aminotri(methylenephosphonic acid), bis(hexamethylene)triamine pentamethylene phosphonic acid, 1,4,7-triazacyclononane-N,N',N"-tris(methylenephosphonic acid (NOTP), hydroxyethyldiphosphonate, nitrilotris(methylene)phosphonic acid, 2-phosphono-butane-1,2,3,4-tetracarboxylic, carboxyethyl phosphonic acid, aminoethyl phosphonic acid, glyphosate, ethylene diamine tetra(methylenephosphonic acid) phenylphosphonic acid, salts thereof, and derivatives thereof) and/or carboxylic acids (e.g., oxalic acid, succinic acid, maleic acid, malic acid, malonic acid, adipic acid, phthalic acid, citric acid, sodium citrate, potassium citrate, ammonium citrate, tricarballylic acid, dimethylolpropionic acid, trimethylolpropionic acid, tartaric acid, glucuronic acid, 2-carboxypyridine) and/or sulfonic acids such as 4,5-Dihydroxy-1,3-benzenedisulfonic acid disodium salt. In other embodiments, the chelating agent includes amino acids such as glycine, alanine, histidine, leucine, isoleucine, lysine, cysteine, methionine, phenylalanine, serine, valine, threonine, arginine, asparagine, aspartic acid, glutamic acid, glutamine, proline, tryptophan, and tyrosine. In other embodiments, the chelating agent includes aminosulfonic acids such as 4-(2-hydroxyethyl)-1-piperazineethanesulfonic acid. In one embodiment, the complexing agent is chosen from at least one of HEDP and citric acid.

The amount of chelating agent(s) in the cleaning composition is in a range from about 0.01 weight % to about 20 weight %, based on the total weight of the cleaning composition. In certain embodiments, the complexing agent is present in an amount of from about 0.01 weight % to about 10 weight %, based on the total weight of the cleaning composition, and in other embodiments, in an amount of from about 0.01 weight % to about 5 weight %.

The amino($C_6$-$C_{12}$ alkyl)alcohols referred to herein are compounds having at least one amine and at least one hydroxyl functional group, in any combination with from 6 to 12 carbon atoms. In one embodiment, the amino($C_6$-$C_{12}$ alkyl)alcohol is chosen from 3-amino-4-octanol; DL-2-amino-1-hexanol; 2-(butylamino)ethanol; 1-aminocyclohexanol; and 8-amino-i-octanol. In one embodiment, the amino($C_6$-$C_{10}$ alkyl)alcohol comprises 3-amino-4-octanol.

In certain embodiments, the composition further comprises one or more fluoride sources. As used herein, "fluoride" source corresponds to species including, but not limited to, an ionic fluoride ($F^-$) and $HF_2$ or a salt comprising same. It is to be appreciated that the fluoride sources may be included as a fluoride species or generated in situ from a fluoride source.

Fluoride sources include, hydrofluoric acid, ammonium fluoride, ammonium bifluoride, hexafluorosilicic acid, tetrafluoroboric acid, tetrabutylammonium tetrafluoroborate (TBA-$BF_4$), hexafluorotantalic acid, hexafluorotitanic acid, ammonium hexafluorotantalate, tetraalkylammonium fluorides having the formula $[NR^1R^2R^3R^4]F$, wherein $R^1$, $R^2$, $R^3$ and $R^4$ are the same as or different from one another and are chosen from $C_1$-$C_6$ alkyls (e.g., methyl, ethyl, propyl, butyl, pentyl, hexyl) and $C_6$-$C_{10}$ aryls (e.g., benzyl), such as tetramethylammonium fluoride, or a combination thereof. In one embodiment, the fluoride source comprises HF.

In further embodiments, the compositions further comprise at least one water-dispersible or water-soluble polymer. Such polymers, when present, include, but are not limited to, acrylic acid and methacrylic acid homopolymer and copolymers with, for example, acrylamidomethylpropane sulfonic acid and maleic acid; maleic acid/vinyl ether copolymer; poly(vinylpyrrolidone)/vinyl acetate; homopolymers such as phosphonated polyethyleneglycol oligomers, poly(acrylamide), poly(acrylic acid) (PAA), poly(methacrylic acid), poly(methacrylic acid) ammonium salt, poly(acrylic acid) ammonium salt, poly(vinyl acetate), poly(ethylene glycol) (PEG), polypropylene glycol) (PPG), poly(styrene sulfonic acid), poly(vinyl sulfonic acid), poly(vinyl phosphonic acid), poly(vinyl phosphoric acid), poly(ethyleneimine), poly(propyleneimine), polyallylamine, polyethylene oxide (PEO), polyvinyl pyrrolidone (PVP), PPG-PEG-PPG block copolymers, PEG-PPG-PEG block copolymers, poly(vinyl alcohol), poly(hydroxyethyl)acrylate (and copolymers thereof), poly(hydroxyethyl)methacrylate (and copolymers thereof), hydroxyethyl cellulose, methylhydroxyethyl cellulose, hydroxypropyl cellulose, methylhydroxypropyl cellulose, xanthan gum, potassium alginate, pectin, carboxymethylcellulose, glucosamine, poly(diallyldimethylammonium) chloride, PEGylated (i.e., polyethyleneglycol-ated) methacrylate/acrylate copolymers, poly MADQuat (poly(2-methacryloxyethyltrimethylammonium chloride) CAS Number 26161-33-1) and copolymers thereof, dimethylaminomethacrylate polymers and copolymers thereof, trimethylammonium methylmethacrylate polymers and copolymers thereof, and combinations thereof. The copolymers above may be random or block copolymers. When present, the amount of polymer(s) in the composition is in a range from about 0.0001 weight % to about 5 weight %, based on the total weight of the composition.

In another embodiment, the composition further comprises a nonionic surfactant. As used herein the term "surfactant" refers to an organic compound that lowers the surface tension (or interfacial tension) between two liquids or between a liquid and a solid, typically an organic amphiphilic compound that contains a hydrophobic group (e.g., a hydrocarbon (e.g., alkyl) "tail") and a hydrophilic group. When present, these non-ionic surfactants for use in the compositions described herein include linear, branched saturated or unsaturated, alkyl or aromatic ethoxylated alcohols. Exemplary surfactants include polyoxyethylene lauryl ether, dodecenylsuccinic acid monodiethanol amide, ethylenediamine tetrakis (ethoxylate-block-propoxylate) tetrol, polyethylene glycols, polypropylene glycols, polyethylene or polypropylene glycol ethers, block copolymers based on ethylene oxide and propylene oxide, polyoxypropylene sucrose ether, t-octylphenoxypolyethoxyethanol, 10-ethoxy-9,9-dimethyldecan-1-amine, Polyoxyethylene (9) nonylphenylether, branched, Polyoxyethylene (40) nonylphenylether, branched, dinonylphenyl polyoxyethylene, nonylphenol alkoxylates, polyoxyethylene sorbitol hexaoleate, polyoxyethylene sorbitol tetraoleate, polyethylene glycol sorbitan monooleate, sorbitan monooleate, alcohol alkoxylates, alkyl-polyglucoside, ethyl perfluorobutyrate, 1,1,3,3,5,5-hexamethyl-1,5-bis[2-(5-norbornen-2-yl)ethyl]trisiloxane, monomeric octadecylsilane derivatives, siloxane modified polysilazanes, silicone-polyether copolymers, and ethoxylated fluorosurfactants.

In other embodiments, the compositions further comprise one or more water-miscible solvents. Such solvents include glycols, and glycol ethers, methanol, ethanol, isopropanol, butanol, and higher alcohols chosen from $C_2$-$C_4$ diols and $C_2$-$C_4$ triols, tetrahydrofurfuryl alcohol, such as 3-chloro-1,2-propanediol, 3-chloro-1-propanethiol, 1-chloro-2-propanol, 2-chloro-1-propanol, 3-chloro-1-propanol, 3-bromo-1,2-propanediol, 1-bromo-2-propanol, 3-bromo-1-propanol, 3-iodo-1-propanol, 4-chloro-1-butanol, 2-chloroethanol), dichloromethane, chloroform, acetic acid, propionic acid, trifluoroacetic acid, tetrahydrofuran N-methylpyrrolidinone, cyclohexylpyrrolidinone, N-octylpyrrolidinone, N-phenylpyrrolidinone, methyldiethanolamine, methyl formate, dimethyl formamide, dimethylsulfoxide, tetramethylene sulfone, diethyl ether, phenoxy-2-propanol, propriophenone, ethyl lactate, ethyl acetate, ethyl benzoate, acetonitrile, acetone, ethylene glycol, propylene glycol, 1,3-propanediol, dioxane, butyryl lactone, butylene carbonate, ethylene carbonate, propylene carbonate, dipropylene glycol, diethylene glycol monomethyl ether, triethylene glycol monomethyl ether, diethylene glycol monoethyl ether, triethylene glycol monoethyl ether, ethylene glycol monopropyl ether, ethylene glycol monobutyl ether, diethylene glycol monobutyl ether, triethylene glycol monobutyl ether, ethylene glycol monohexyl ether, diethylene glycol monohexyl ether, ethylene glycol phenyl ether, propylene glycol methyl ether, dipropylene glycol methyl ether, tripropylene glycol methyl ether, dipropylene glycol dimethyl ether, dipropylene glycol ethyl ether, propylene glycol n-propyl ether, dipropylene glycol n-propyl ether, tripropylene glycol n-propyl ether, propylene glycol n-butyl ether, dipropylene glycol n-butyl ether, tripropylene glycol n-butyl ether, propylene glycol phenyl ether, ethylene glycol monophenyl ether, diethylene glycol monophenyl ether hexaethylene glycol monophenylether, dipropylene glycol methyl ether acetate, tetraethylene glycol dimethyl ether, dibasic ester, glycerine carbonate, N-formyl morpholine, triethyl phosphate, and combinations thereof.

In other embodiments, the compositions further comprise one or more adjuvants. In one embodiment, the adjuvants are chosen from compounds which function as hydrogen bonding additives, which serve to reduce silica particles from sticking to brushes utilized in the cleaning of post-CMP microelectronic devices. See, for example, U.S. Patent Publication No. 2019/0168265, incorporated herein by reference. Exemplary compounds include non-ionic, anionic, cationic, and zwitterionic small molecules and polymers that may behave as a polyelectrolyte at neutral pH. Anionic polymers or anionic polyelectrolytes can be natural, modified natural polymers, or synthetic polymers. Exemplary natural and modified natural anionic polymers that can be included in the composition include, but are not limited to: alginic acid (or salts), carboxymethylcellulose, dextran sulfate, poly(galacturonic acid), and salts thereof. Exemplary synthetic anionic polyelectrolytes include, but are not limited to: homopolymers or copolymers of maleic acid (or anhydride), styrene sulfonic acid (or salts), vinyl sulfonic acid (or salts), allyl sulfonic acid (or salts), acrylamidopropyl sulfonic acid (or salts), and the like, wherein the salts of the carboxylic acid and sulfonic acids are preferably neutralized with an ammonium or alkylammonium cation. In one embodiment, cations of a polyelectrolyte anionic polymer are ammonium cations ($NH_4^+$), cholinium ($^+N(CH_3)_3(CH_2CH_2OH)$), and $^+N(CH_3)_4$. Thus, examples of combined synthetic and natural polyelectrolyte anionic polymers are homopolymers or copolymers of (meth)acrylic acid, maleic acid (or anhydride), styrene sulfonic acid, vinyl sulfonic acid, allyl sulfonic acid, vinylphosphonic acid, acrylamidopropyl sulfonic acid, alginic acid, carboxymethylcellulose, dextran sulfate, poly(galacturonic acid), and salts thereof.

In another embodiment, the composition further comprises a biocide. Exemplary biocides include 5-chloro-2-methyl-4-isothiazolin-3-one, 2-methyl-4-isothiazolin-3-one, benzisothiazolone, 1,2-benzisothiazol-3[2H]-one, methylisothiazolinone, methylchloroisothiazolinone, and combinations thereof.

As used herein, the term "residue" (which is inclusive of a "contaminant") refers to any material that is a chemical or particulate material that remains present at a surface of a microelectronic device substrate after a processing step used in the fabrication of a microelectronic device, for example processing steps including plasma etching, plasma ashing (to remove photoresist from an etched wafer), chemical-mechanical processing, wet etching, etc. The residue may be any non-aqueous chemical material that is part of a processing composition used in the processing step, such as a chemical etchant, a photoresist, a CMP slurry, etc. The residue may alternately be a substance that is derived from a material of the processing composition during a processing step. Examples of these types of residues include non-aqueous, particulate or non-particulate, chemical or abrasive materials (e.g., abrasive particles, surfactant, oxidizer, corrosion inhibitor, catalyst) that remain at a surface of the substrate after processing. The residue may be originally present in a material such as a CMP slurry or an etching composition, such as a solid abrasive particle or chemical material present in a CMP abrasive slurry. Alternately, a residue may be a by-product or a reaction product (in particulate or non-particulate form that is generated during processing, e.g., a by-product or reaction product of a chemical present in a processing composition such as CMP slurry or wet etching composition, or a chemical that is present, used during, or produced during a plasma etching or a plasma ashing process.

The term "post-CMP residue" refers to residue that is present at an end of a CMP processing step, for example a particle or chemical material that is present in or derived from a CMP slurry; specific examples include abrasive particles (e.g., silica-containing or silica-based abrasive particles, metal oxide (e.g., alumina) particles, ceria or ceria-based particles and the like); chemicals that are originally present in the slurry such as an oxidizer, catalyst, surfactant, inhibitor, complexing agent, etc.; a metal (e.g., ion), metal oxide, or metal complex that is derived from a metal material removed from the substrate surface being processed; or a reaction product or complex produced using a chemical of the slurry with another chemical of the slurry or with a chemical material derived from the substrate, such as a metal ion; pad particles; or any other material that is a product of the CMP process.

A "post-etch residue" refers to a material remaining following a gas-phase plasma etching process, e.g., back-end-of-line ("BEOL") dual damascene processing, or wet etching processes. A post-etch residue may be organic, organometallic, organosilicic, or inorganic in nature, for example, silicon-containing material, carbon-based organic material, and etch gas residues such as oxygen and fluorine.

A "post-ash residue" refers to material remaining following oxidative or reductive plasma ashing to remove hardened photoresist and/or bottom anti-reflective coating (BARC) materials. The post-ash residue may be organic, organometallic, organosilicic, or inorganic in nature.

As used herein a "low-k dielectric material" is a material used as a dielectric material in a multi-layer microelectronic device, wherein the material has a dielectric constant less than about 3.5. Example low-k dielectric materials include low-polarity materials such as silicon-containing organic polymers, silicon-containing hybrid organic-inorganic materials, organosilicate glass (OSG), tetraethyl orthosilicate (TEOS), fluorinated silicate glass (FSG), and carbon-doped oxide (CDO) glass. A low-k dielectric materials may have a density and a porosity from among a range of useful densities and from a range of useful porosities.

As noted above, the present invention relates to compositions ("cleaning compositions" or "cleaning solutions") that are useful in a cleaning method that removes residue from a surface of a microelectronic device substrate that has residue thereon. The compositions contain an aqueous carrier (i.e., water) along with a combination of non-aqueous ingredients that include: a reducing agent, a chelating agent, and an amino($C_6$-$C_{12}$ alkyl)alcohol. In certain embodiments, the compositions, before being used in a cleaning process, are homogeneous solutions that comprise, consist of, or consist essentially of water and dissolved non-aqueous ingredients, in the absence of any solid or suspended materials such as solid abrasive particles, agglomerates, coagulates, etc.

A composition as described is useful for cleaning microelectronic devices and precursors thereof, specifically including microelectronic device substrates, meaning semiconductor wafers that include on a surface one or more microelectronic devices or precursors thereof that are in the process of being fabricated into final, completed and functional microelectronic devices.

As used herein, a microelectronic device is a device that includes electrical circuits and related structures of very small (e.g., micron-scale or smaller) dimensions formed thereon. Exemplary microelectronic devices include flat panel displays, integrated circuits, memory devices, solar panels, photovoltaics, and microelectromechanical systems (MEMS). A microelectronic device substrate is a structure such as a wafer (e.g., semiconductor wafer) that includes one or more microelectronic devices or precursors thereof, in a state of being prepared to form a final microelectronic device.

The compositions and methods described herein are useful to clean any of various forms of microelectronic devices, at any stage of processing. Microelectronic device substrates (or simply "substrates," herein, for short) that can be cleaned with particular utility and benefit include substrates that include exposed surfaces comprising aluminum oxide, TEOS, thermal silicon oxide, borosilicate or phosphate silicon dioxide glasses, polysilicon amorphous silicon, single crystal silicon, silicon carbide, silicon nitride, silicon oxycarbide, silicon oxynitride, tungsten, molybdenum, organic polymers, low k dielectrics, spin-on glasses, siloxane based dielectrics, and organic hybrid glasses, at a surface of the substrate. A high percentage of residue that is present at a substrate surface can be successfully removed from the surface by use of cleaning compositions and methods described herein, for example at least 70, 80, 85, 90, 95, or 99 percent of residue may be removed (also referred to as "cleaning efficiency").

Some cleaning compositions may be capable of removing multiple types of particle residues. For example, some cleaning compositions having a pH of from 2 to 4 that effectively remove ceria particles from an alumina substrate surface have also been found to be capable of dispersing alumina particles, keeping these particles from reattaching to the alumina surface without attacking the substrate. These compositions may also have a low but appreciative etch rate (such as less than 10 Å/min) to give a controlled undercut to the detach these particles.

Methods and equipment for measuring residue at a surface of a microelectronic device substrate are well known. Cleaning efficiency may be rated based on a reduction of an amount (e.g., number) of residue particles present on a microelectronic device surface after cleaning, compared to the amount (e.g., number) of residue particles present before cleaning. For example, pre- and post-cleaning analysis may be carried out using an atomic force microscope.

Residue particles on a surface may be registered as a range of pixels. A histogram (e.g., a Sigma Scan Pro) may be applied to filter the pixels in a certain intensity, e.g., 231-235, and the number of residue particles counted. The amount of residue particle removal, i.e., cleaning efficiency, may be calculated using the ratio:

(Number of Pre-Clean Residue Particles on a Surface−Number of Post-Clean Residue Particles on the Surface)/(Number of Pre-Clean Residue Particles on the Surface).

Alternately, cleaning efficiency may be considered as a percentage of a total amount of a substrate surface that is covered by residue particulate matter before as compared to after cleaning. For example, an atomic force microscope may be programmed to perform a z-plane scan to identify topographic areas of interest above a certain height threshold, and then calculate the area of the total surface covered by the areas of interest. A reduced amount of area determined to be areas of interest, after cleaning, indicates a more efficacious cleaning composition and cleaning process.

The compositions of the invention can be prepared and then sold in the form a concentrate, which contains water at a relatively low amount, and, consequently, a relatively concentrated amount of non-aqueous ingredients. The concentrate is prepared commercially to be sold and transported while containing the concentrated amount of non-aqueous ingredients and relatively reduced amount of water, and to be eventually diluted by a purchaser of the concentrate at a point of use. The amounts of the different non-aqueous ingredients in the concentrate are amounts that, upon dilution of the concentrate, will result in desired amounts of those non-aqueous ingredients being present in the use composition.

The composition as described includes water as a liquid carrier, i.e., solute, of the non-aqueous ingredients. The water can be deionized (DIW) water. Water can be present in the composition from any source, such as by being contained in an ingredient that is combined with other ingredients to produce a composition in the form of a concentrate; or as water combined in pure form to other ingredients of a concentrate; or as water added to a concentrate by a user, e.g., at a point of use, as dilution water for the purpose of diluting the concentrate to form a use composition.

The amount of water in a composition can be a desired amount for a concentrate, or a desired amount of a use composition, which is generally a higher total amount relative to the amount of water in a concentrate. Exemplary amounts of water in a concentrate composition, not to be considered limiting, may be from about 30, 40, or 50 to about 85 or 90 weight percent, e.g., from about 60, 65, or 70 to about 80 weight percent water, based on total weight of a concentrate composition. Upon dilution, these amounts will be reduced by a factor of the dilution. Example amounts of water in a use composition may be from about 70 to about 99.9 weight percent, e.g., from about 90 or 99.55 to about 95 or 99 weight percent water based on total weight of the use composition.

The compositions of the invention contain an amino($C_6$-$C_{12}$ alkyl)alcohol as a primary cleaning compound.

As a secondary cleaning compound, the compositions may optionally further contain a $C_2$-$C_4$ alkanolamine such as monoethanolamine. Additional optional components include morpholine, alginic acid, carboxymethylcellulose, poly(vinyl pyrrolidone), poly(4-styrenesulfonic acid) (PSSA), ethoxylated fatty alcohol, and (4-(2-hydroxyethyl)-1-piperazineethanesulfonic acid.

The composition of the invention can be easily prepared by simple addition of the respective ingredients and mixing to homogeneous condition, such as a solution. Furthermore, a composition may be readily formulated as single-package formulations or multi-part formulations that are mixed at or before the point of use, e.g., the individual parts of the multi-part formulation may be mixed by a user either at a processing tool (cleaning apparatus) or in a storage tank upstream of the processing tool.

Accordingly, another aspect of the invention relates to a kit comprising, in one or more containers, one or more components of the composition as set forth herein. The kit may comprise, in one or more containers, (i) a reducing agent; (ii) a chelating agent; (iii) an amino($C_6$-$C_{10}$ alkyl) alcohol, for combining with additional solvent (e.g., water) at the fab or the point of use. The kit may also include the other optional ingredients recited herein. The containers of the kit must be suitable for storing and shipping the compositions and may be, for example, NOWPak® containers (Entegris, Inc., Billerica, Mass., USA).

Additionally, a composition as described herein may be provided commercially for sale in the form of a concentrate that can be diluted with an appropriate amount of water at a point of use. In a concentrate form, the composition (concentrate) includes non-aqueous ingredients as set forth herein that will be present in the concentrate in amounts such that when the concentrate is diluted with a desired amount of water (e.g., DI water) each component of the cleaning composition will be present in the diluted use composition in an amount that is desired for use in a cleaning step such as a post-CMP cleaning step. The amount of water added to the concentrate to form the use composition may be one or multiple volumes of water per volume of the concentrate, for example 2 volumes of water (e.g., 3, 4, 5, or 10 volumes of water) per volume of the concentrate. When the concentrate is diluted with such an amount of water, each of the solid components of the concentration will be present in the use composition in a concentration that is reduced based on the number of volumes of water added to dilute the concentrate.

A cleaning composition as described can be useful in microelectronic device processing applications that include processes for cleaning a substrate surface by a method such as post-etch residue removal, post-ash residue removal surface preparation, post-CMP residue removal, and the like.

The compositions and method of the invention are effective to remove a substantial amount of residue from the surface, of an amount that is initially present at the surface before the cleaning step, but without substantially damaging the substrate. In one embodiment, the cleaning composition can be effective, in a cleaning step, to remove at least 85 percent of residue present on a surface of the substrate prior to residue removal by a cleaning step, or at least 90 of residue, or at least 95 percent of residue, or at least 99 percent of residue initially present before the cleaning step.

In a cleaning step, such as a post-CMP residue cleaning step, a cleaning composition may be used with any of a variety of known, conventional, commercially available cleaning tools such as megasonics and brush scrubbing, including, but not limited to, Verteq single wafer megasonic Goldfinger, OnTrak systems DDS (double-sided scrubbers), SEZ or other single wafer spray rinse, Applied Materials Mirra-Mesa™/Reflexion™/Reflexion LK™, and Megasonic batch wet bench systems, and Ebara Technologies, Inc. products such as 300 mm models (FREX300S2 and FREX300X3SC) and the 200 mm CMP system (FREX200M).

Conditions and timing of a cleaning step can be as desired and may vary depending on the type of substrate and residue. In use of a composition for cleaning post-CMP residue, post-etch residue, post-ash residue or contaminants from a microelectronic device substrate having same thereon, the cleaning composition may be contacted with the substrate surface for a time of from about 1 second to about 20 minutes, e.g., from about 5 second to 10 minutes, or from about 15 sec to about 5 minutes, at temperature in a range of from about 20° C. to about 90° C., or about 20° C. to about 50° C. Such contacting times and temperatures are illustrative, and any other suitable time and temperature conditions may be useful if efficacious to at least partially, preferably substantially, clean an initial amount of residue from a surface.

Following desired level of cleaning of a device substrate surface, the cleaning compositions used in a cleaning step may be readily removed from the device surface, as may be desired and efficacious in a given end use application. For example, removal may be performed by use of a rinse solution that includes deionized water. Thereafter, the device may be processed as desired, such as by being dried (e.g., using nitrogen or a spin-dry cycle), followed by subsequent processing of the cleaned and dried device surface.

In other more general or specific methods, a microelectronic device substrate may first be subjected to processing step that includes by any one or more of CMP processing, plasma etching, wet etching, plasma ashing, or the like, followed by a cleaning step that includes cleaning the substrate surface with the compositions of the present invention. At the end of the first processing step, residue (e.g., post-etch residue, post-CMP residue, post ash residue, etc.) will be present at a surface of the substrate. The cleaning step, using a cleaning composition as described, will be effective to clean a substantial amount of the residue from the microelectronic device surface.

Accordingly, in a further aspect, the invention provides a method for removing residues on a microelectronic device substrate, the method comprising:

contacting the surface of a microelectronic device substrate with a composition comprising:

a. a reducing agent;

b. a chelating agent;

c. an amino($C_6$-$C_{12}$ alkyl)alcohol; and d. water;

wherein the composition has a pH of less than about 8, and at least partially removing the residues from the substrate.

EXAMPLES

This invention can be further illustrated by the following examples of certain embodiments thereof, although it will be understood that these examples are included merely for purposes of illustration and are not intended to limit the scope of the invention unless otherwise specifically indicated.

The following compositions were prepared. Amounts indicated are in weight percent.

| Raw material | Comp Ex 1 | Ex. 1 | Ex. 2 | Ex. 3 | Ex. 4 | Ex. 5 | Ex.6 |
|---|---|---|---|---|---|---|---|
| DIW[1] | 83.42 | 80.95 | 85.48 | 83.81 | 85.9 | 85.5 | 80.45 |
| PSSA[2] | — | — | 0.25 | 0.25 | — | — | — |
| TGMBE[3] | 2.5 | 2.5 | 2.5 | 2.5 | 2.5 | 2.5 | 2.5 |
| Brij L23[4] | — | — | — | — | 0.1 | 0.5 | — |
| HEPES[6] | — | — | — | — | — | — | 0.5 |
| Citric Acid | 1 | 1 | 1 | 1 | 1 | 1 | 1 |
| HEDP[5] | 3 | 3 | 3 | 3 | 3 | 3 | 3 |
| $H_3PO_2$ | 1 | 1 | 1 | — | 1 | 1 | 1 |
| L-ascorbic acid | — | — | — | 2.67 | — | — | — |
| PAA[6] | — | — | — | — | — | — | — |
| 3-amino-4-octanol | — | 2.5 | 2.5 | 2.5 | 2.5 | 2.5 | 2.5 |
| $HNO_3$ | 1 | 1 | — | — | — | — | 1 |
| Choline Hydroxide | 8.08 | 8.05 | 4.27 | 4.27 | 4 | 4 | 8.05 |

[1]deionized water
[2]poly(styrene sulfonic acid)
[3]triethylene glycol monobutyl ether
[4]polyoxyethylene(23) lauryl ether
[5]polyacrylic acid
[6]N-(2-Hydroxyethyl)piperazine-N'-(2-ethanesulfonic acid)

Performance Summary

The compositions set forth above as Comparative Example 1 and Examples 1-5 were subjected to the following tests:

General Procedure for Etch Rate Experiments:

The coupons were cut to a size of approximately 2.3 cm by 2.3 cm. Pre and post etching thickness measurements were done by XRF (metal film by Rikagu ZSX-400) or ellipsometer (non-metallic film or metal oxide film by JA Woollam M-2000D). For the poly Si samples, the surface was pre-treated in a Teflon beaker (1% HF solution); the coupons were dipped into this solution for 15 minutes and then rinsed with deionized water and immediately dried with nitrogen. The coupons were then placed into the beaker for a period of time with agitation by a stir bar (~500 rpm), then immediately rinsed with deionized water and dried with nitrogen flow. Thus, the average etch rate value is:

AER=[(pre thickness)−(post thickness)]/(time spend for chemical (HF solution) dipping.

In this experiment, the lower average indicates less damage to the film.

General Procedure or Poly Si-DIW C/a (Contact Angle) Experiments:

The coupons were cut to a size of approximately 2.3 cm by 2.3 cm. Pretreatment for surface clean and cleaner dip conducted as in part A and dried under a stream of nitrogen. The contact angle was determined with Kruss Scientific DAS100 contact angle meter—the coupon was placed onto the holder of the contact angle meter which proceeds water drop loading and contact angle measurement. The as-pretreated coupons were placed in the holder for measurement of "pre", which is the wetting property of pure poly Si without the effect of contribution from surface contamination. In the experiment, the lower the contact angle, the better the deionized water wetting/hydrophilicity.

Zeta Potential Measurement was Determined on Commercially Available Ceria Particles in the Various Cleaning Solutions.

The ceria particles were stirred in a blending machine to ensure particles are well-dispersed in the cleaning solutions and then transferred into the holder of zeta potential machine (Beckman Coulter, Delsa Nano C) for automatic zeta potential measurement. In this experiment, the greater absolute value of the zeta potential (irrespective of the +/−sign) the better, because it means a higher charge density that forces particles to repel each other.

General Procedure for Zeta Potential Measurement of Poly Si/TEOS in a Cleaner.

The coupons were cut to a size of approximately 2.3 cm by 2.3 cm. The poly Si coupons were pretreated with dilute HF per the process delineated in procedure A above. The coupons were placed in the holder for the surface potential measurement (in an Anton Paar, SurPASS3), which automatically measures the zeta potential. In this experiment, the greater absolute value of the zeta potential (irrespective of the +/−sign) the better, because it means a higher charge density that forces particles to repel each other.

General Procedure for Ceria Dissolution by Compositions

Commercially available ceria particles were blended mechanically to ensure particles were well-dispersed, and then added to the various cleaning solutions (in a Teflon beaker). The samples were then stirred for 5 minutes. The solution was transferred to a centrifuge tube and centrifuged at 15,000 for 15 minutes. A 2m sample of the supernatant (i.e., upper layer) was taken and the cerium concentration was determined by CP-OES analysis (Inductively-coupled optical emission spectrometry). In this experiment, the higher the ICP-OES cerium concentration is better as this indicates more ceria is dissolved/dispersed in the solution.

General Procedure for Defectivity Evaluation

The purpose of this measurement is to evaluate how well the compositions can clean a TEOS wafer substrate. The compositions were prepared and filtered. TEOS wafers (8 inch in diameter), a commercially available ceria slurry, and proper CMP/post-clean parts and consumables were used for whole wafer polish experiments. The 200 mm wafers were polished on process on a Mirra® and cleaned on OnTrak® sold by Advanced Materials and Technology and the defects were measured by SP1 with the threshold>0.11 μm (to count how many particles could be found on the processed wafers).

In an eighth aspect, the invention provides the composition of any one of the first through the seventh aspects, further comprising a water-soluble or water-dispersible polymer.

In a ninth aspect, the invention provides the composition of any one of the first, second, fourth, fifth, or seventh, aspects, further comprising at least one of poly(styrenesulfonic acid); polyoxyethylene(23) lauryl ether; glutamic acid, and aspartic acid.

In a tenth aspect, the invention provides the compositions of any one of the first through ninth aspects, wherein the composition further comprises N-(2-hydroxyethyl)piperazine-N'-(2-ethanesulfonic acid), or a salt thereof.

In an eleventh aspect, the invention provides the composition of any one of the first through the tenth aspects,

| | | Pre | Comp Ex 1 | Ex. 1 | Ex. 2 | Ex. 3 | Ex. 4 | Ex. 5 | Ex.6 |
|---|---|---|---|---|---|---|---|---|---|
| Poly Si | Average | — | 0.17 | 0.80 | −0.23 | −0.20 | −0.04 | 0.06 | 0.96 |
| etch rate | Std Dev | — | 0.03 | 0.10 | 0.04 | 0.03 | 0.10 | 0.03 | 0.05 |
| TEOS etch | Average | — | 0.09 | 0.38 | −0.02 | 0.00 | −0.11 | −0.10 | 0.03 |
| rate | Std Dev | — | 0.15 | 0.41 | 0.02 | 0.02 | 0.04 | 0.07 | 0.03 |
| Wet etch | Average | — | 0.31 | 0.56 | 0.50 | 0.03 | 0.11 | 0.12 | |
| rate | Std Dev | — | 0.14 | 0.18 | 0.06 | 0.04 | 0.07 | 0.09 | |
| Poly Si | Average | 78.4 | 57.5 | 33.7 | 53.2 | 60.2 | 61.0 | 59.0 | 62.5 |
| DIW CA | Std Dev | 0.7 | 1.1 | 1.4 | 0.8 | 0.4 | 0.7 | 0.3 | 1.5 |
| Ceria Particle zeta potential (mV) | | — | −48.8 | −53.0 | −50.4 | −53.0 | −48.4 | −46.5 | −34.6 |
| Poly Si | Average | — | −25.4 | −36.6 | −44.7 | −51.5 | −4.5 | −4.4 | 23.8 |
| zeta potential (mV) | Std Dev | — | 1.2 | 3.6 | 0.3 | 2.3 | 0.1 | 0.6 | 1.6 |
| TEOS zeta | Average | — | −4.9 | −21.1 | −35.9 | −37.5 | 0.9 | −2.2 | −22.1 |
| potential (mV) | Std Dev | — | 1.3 | 0.7 | 2.4 | 1.1 | 0.3 | 1.1 | 2.1 |
| Ceria dissolution (ppb) | | — | 15948 | 14126 | 28545 | 33906 | 21807 | 23258 | 12410 |
| Defectivity | Average | — | 193 | 133 | | | | | 93 |
| (Counts > 0.11 μm) | Std Dev | — | 14 | 8 | | | | | 19 |
| pH | | — | 4.2 | 6.8 | 4.4 | 4.8 | 4.2 | 4.2 | |

Aspects

In a first aspect, the invention provides a composition comprising a. a reducing agent;

b. a chelating agent;

c. an amino ($C_6$-$C_{12}$ alkyl)alcohol; and d. water;

wherein the composition has a pH of less than about 8.

In a second aspect, the invention provides the composition of the first aspect, wherein the reducing agent is chosen from hypophosphorous acid, diethylhydroxylamine, sulfurous acid, and L-ascorbic acid.

In a third aspect, the invention provides the composition of the first or second aspect, wherein the chelating agent is chosen from aspartic acid, glutamic acid, citric acid, phosphoric acid, nitrile-tris (methylene phosphonic acid), and 1-hydroxyethylidene-1,1-diphosphonic acid.

In a fourth aspect, the invention provides the composition of the first, second, or third aspect, wherein the an amino ($C_6$-$C_{12}$ alkyl) alcohol comprises 3-amino-4-octanol.

In a fifth aspect, the invention provides the composition of any one of the first through the fourth aspects, further comprising a fluoride source.

In a sixth aspect, the invention provides the composition of any one of the first through the fifth aspects, further comprising a nonionic surfactant.

In a seventh aspect, the invention provides the composition of any one of the first through the sixth aspects, further comprising a water-miscible solvent.

wherein the composition is devoid of corrosion inhibitors. The term "devoid" is intended to correspond to less than 0.001 wt. % or below a concentration having an efficacious effect.

In a twelfth aspect, the invention provides a method for removing residues on a microelectronic device substrate, the method comprising:

contacting the surface of a microelectronic device substrate with a composition comprising:

a. a reducing agent;

b. a chelating agent;

c. an amino ($C_6$-$C_{12}$ alkyl)alcohol; and d. water;

wherein the composition has a pH of less than about 8, and at least partially removing the residues from the substrate.

In a thirteenth aspect, the invention provides the method of the twelfth aspect, wherein the reducing agent is chosen from hypophosphorous acid, diethylhydroxylamine, sulfurous acid, and L-ascorbic acid.

In a fourteenth aspect, the invention provides the method of the twelfth or thirteenth aspect, wherein the chelating agent is chosen from aspartic acid, glutamic acid, citric acid, phosphoric acid, nitrile-tris (methylene phosphonic acid), and 1-hydroxyethylidene-1,1-diphosphonic acid. The composition of claim 1, wherein the an amino ($C_6$-$C_{12}$ alkyl) alcohol comprises 3-amino-4-octanol.

In a fifteenth aspect, the invention provides the method of any one of the twelfth through the fourteenth aspects, wherein the composition further comprises a fluoride source.

In a sixteenth aspect, the invention provides the method of any one of the twelfth through the fifteenth aspects, wherein the composition further comprises a nonionic surfactant.

In a seventeenth aspect, the invention provides the method of any one of the twelfth through the sixteenth aspects, wherein the composition further comprises a water-miscible solvent.

In an eighteenth aspect, the invention provides the method of any one of the twelfth through the seventeenth aspects, wherein the composition further comprises a water-soluble or water-dispersible polymer.

In a nineteenth aspect, the invention provides the method of any one of the twelfth through eighteenth aspects, wherein the composition further comprises at least one of poly(styrenesulfonic acid); polyoxyethylene(23) lauryl ether; glutamic acid, and aspartic acid.

In a twentieth aspect, the invention provides the method of any one of the twelfth through nineteenth aspects, wherein the composition further comprises 4-(2-hydroxyethyl)-1-piperazineethanesulfonic acid, or a salt thereof.

In a twenty-first aspect, the invention provides the method of any one of the twelfth through the twentieth aspects, wherein the composition is devoid of corrosion inhibitors.

In a twenty-second aspect, the invention provides a kit comprising, in one or more containers, two or more of (i) a reducing agent; (ii) a chelating agent; (iii) an amino ($C_6$-$C_{10}$ alkyl) alcohol; and water.

In a twenty-third aspect, the invention provides the kit of the twenty-second aspect, wherein the composition is as set forth in any one of the first through the eleventh aspects.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A method for removing residues on a microelectronic device substrate, the method comprising:

contacting the surface of a microelectronic device substrate with a composition comprising:

a. a reducing agent;

b. a chelating agent;

c. an amino ($C_6$-$C_{12}$ alkyl)alcohol; and d. water;

wherein the composition has a pH of less than about 8, and wherein the composition further comprises 4-(2-hydroxyethyl)-1-piperazineethanesulfonic acid, or a salt thereof, and at least partially removing the residues from the substrate.

2. The method of claim 1, wherein the reducing agent is selected from the group consisting of hypophosphorous acid, diethylhydroxylamine, sulfurous acid, and L-ascorbic acid.

3. The method of claim 1, wherein the chelating agent is selected from the group consisting of aspartic acid, glutamic acid, citric acid, phosphoric acid, nitrile-tris (methylene phosphonic acid), and 1-hydroxyethylidene-1,1-diphosphonic acid.

4. The method of claim 1, wherein the composition further comprises a fluoride source.

5. The method of claim 1, wherein the composition further comprises a nonionic surfactant.

6. The method of claim 1, wherein the composition further comprises a water-miscible solvent.

7. The method of claim 1, wherein the composition further comprises a water-soluble or water-dispersible polymer.

8. The method of claim 1, wherein the composition further comprises at least one of poly(styrenesulfonic acid); polyoxyethylene(23) lauryl ether; glutamic acid, and aspartic acid.

9. The method of claim 1, wherein the composition is devoid of corrosion inhibitors.

* * * * *